United States Patent
Shukla et al.

(10) Patent No.: US 8,321,487 B1
(45) Date of Patent: Nov. 27, 2012

(54) RECOVERY OF DIRECTORY INFORMATION

(75) Inventors: Ritesh Shukla, Somerville, MA (US);
Rossen Dimitrov, Nashua, NH (US)

(73) Assignee: EMC Corporation, Hopkinton, MA (US)

( * ) Notice: Subject to any disclaimer, the term of this patent is extended or adjusted under 35 U.S.C. 154(b) by 165 days.

(21) Appl. No.: 12/803,604

(22) Filed: Jun. 30, 2010

(51) Int. Cl.
*G06F 17/30* (2006.01)

(52) U.S. Cl. ......... 707/956; 707/651; 707/694; 707/829

(58) Field of Classification Search .................. 707/651, 707/694, 829, 956, 999.02, 999.205
See application file for complete search history.

(56) References Cited

U.S. PATENT DOCUMENTS

| | | | |
|---|---|---|---|
| 2002/0133491 A1* | 9/2002 | Sim et al. .......................... | 707/10 |
| 2006/0031558 A1* | 2/2006 | Ortega et al. .................. | 709/232 |
| 2009/0112789 A1 | 4/2009 | Oliveira et al. | |
| 2009/0222509 A1* | 9/2009 | King et al. ..................... | 709/203 |
| 2010/0332818 A1* | 12/2010 | Prahlad et al. ................. | 713/150 |
| 2011/0258342 A1* | 10/2011 | Gagliardi et al. ............. | 709/241 |
| 2011/0258461 A1* | 10/2011 | Bates ............................. | 713/190 |
| 2011/0276656 A1* | 11/2011 | Knapp et al. .................. | 709/219 |
| 2011/0295904 A1* | 12/2011 | Mohan et al. ................. | 707/802 |

OTHER PUBLICATIONS

U.S. Appl. No. 12/685,635, filed Feb. 9, 2010, Protopopov et al.

* cited by examiner

*Primary Examiner* — Leslie Wong
(74) *Attorney, Agent, or Firm* — Muirhead and Saturnelli, LLC

(57) ABSTRACT

Locating a file object in a storage system includes determining at least one characteristic of the file object, obtaining a subset of nodes in the storage system by applying the at least one characteristic to criteria for storing file objects at particular ones of the nodes in the storage system, and examining the subset of nodes to determine if any contain the file object. A metadata location server may be used to obtain the subset of nodes. The criteria may include at least one policy relating to placement of objects corresponding to files at the time the files are created. The policies may relate to owners of the files. The characteristic information may include the owner of a target file corresponding to the file object, the date that the target file was created, a business organization associated with the target file, and/or the size of the target file.

9 Claims, 4 Drawing Sheets

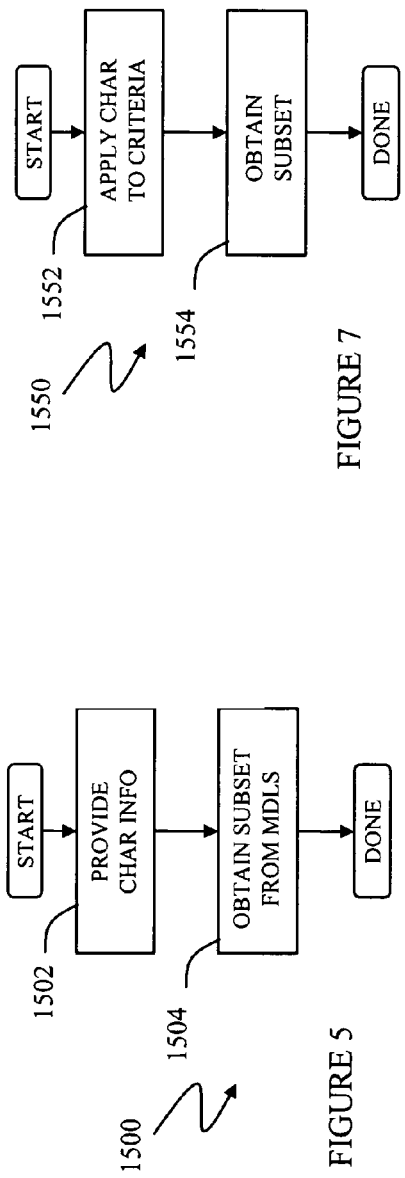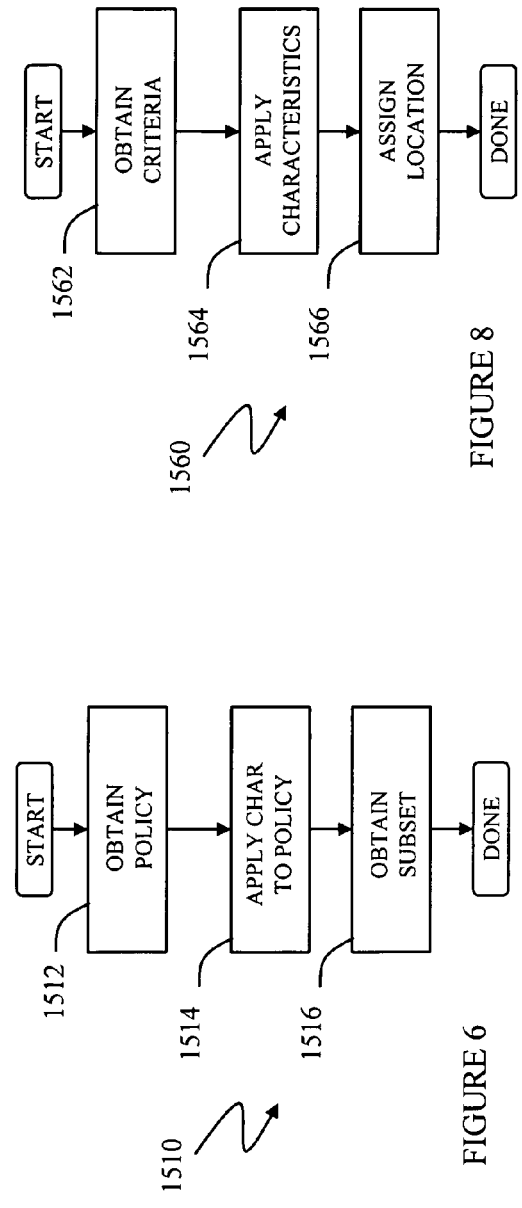

RECOVERY OF DIRECTORY INFORMATION

BACKGROUND OF THE INVENTION

1. Technical Field

This application relates to the field of storing data, and more particularly to the field of storing and retrieving data in a large data storage system.

2. Description of Related Art

Information that is added annually to the digital universe is estimated to be around 988 billion gigabytes, which is about eighteen million times the information in all the books ever written. The type of information that is stored includes rich digital media and unstructured business content. There is also an ongoing conversion from analog to digital formats—film to digital image capture, analog to digital voice, and analog to digital TV. The rich digital media and unstructured business content have unique characteristics and storage requirements that are different from structured data types (e.g. database records).

Many conventional storage systems are highly optimized to deliver high performance I/O for small chunks of data. Furthermore, these systems were designed to support gigabyte and terabyte sized information stores. However, rich digital media and unstructured business content have greater capacity requirements (petabyte versus gigabyte/terabyte sized systems), less predictable growth and access patterns, large file sizes, billions and billions of objects, high throughput requirements, single writer, multiple reader access patterns, and a need for multi-platform accessibility. In some cases, conventional storage systems have met these needs in part by using specialized hardware platforms to achieve required levels of performance and reliability. Unfortunately, the use of specialized hardware results in higher customer prices and may not support volume economics as the capacity demands grow large.

Some of these issues have been addressed using cloud storage, such as the cloud storage system provided by EMC Corporation of Hopkinton, Mass. Such a system is disclosed, for example, in U.S. patent application no. 20090112789 (the '789 application), which is incorporated herein by reference. The '789 application provides a system where data objects are distributed among different servers in different locations. Conventional hierarchal directory structures may be supported by having some of the data objects represent subdirectories that contain pointers to other data objects that represent either data files or represent additional subdirectories. Thus, for example, a data file corresponding to the file path specification "C:\ABC\DEF\GHI.doc" may be provided by a first object corresponding to the root volume, "C:\", that points to an object that corresponds to the subdirectory "ABC", that points to an object that corresponds to the subdirectory "DEF", that points to an object that corresponds to the data file "GHI.doc".

Accessing the object corresponding to "GHI.doc" includes beginning at the object corresponding to the root node and then traversing the objects corresponding to the subdirectory nodes. However, if one or more of the subdirectory objects becomes unavailable, then it may be difficult/impractical to find the object corresponding to "GHI.doc" even if that object is available. Accordingly, it is desirable to provide a system that efficiently locates data objects corresponding to files in a hierarchical directory structure in instances where objects corresponding to subdirectory nodes become unavailable.

SUMMARY OF THE INVENTION

According to the system described herein, locating a file object in a storage system includes determining at least one characteristic of the file object, obtaining a subset of nodes in the storage system by applying the at least one characteristic to criteria for storing file objects at particular ones of the nodes in the storage system, and examining the subset of nodes to determine if any contain the file object. A metadata location server may be used to obtain the subset of nodes. The criteria may include at least one policy relating to placement of objects corresponding to files at the time the files are created. The policies may relate to owners of the files. The characteristic information may include the owner of a target file corresponding to the file object, the date that the target file was created, a business organization associated with the target file, and/or the size of the target file. The file object may correspond to a target file that is part of a hierarchal directory structure. At least one node of the hierarchal directory structure may be unavailable.

According further to the system described herein, computer software, provided in a non-transitory computer readable medium, locates a file object in a storage system. The software includes executable code that determines at least one characteristic of the file object, executable code that obtains a subset of nodes in the storage system by applying the at least one characteristic to criteria for storing file objects at particular ones of the nodes in the storage system, and executable code that examines the subset of nodes to determine if any contain the file object. A metadata location server may be used to obtain the subset of nodes. The criteria may includes at least one policy relating to placement of objects corresponding to files at the time the files are created. The policies may relate to owners of the files. The characteristic information may includes the owner of a target file corresponding to the file object, the date that the target file was created, a business organization associated with the target file, and/or the size of the target file. The file object may correspond to a target file that is part of a hierarchal directory structure. At least one node of the hierarchal directory structure may be unavailable.

According further to the system described herein, a data storage system includes a plurality of clients that access files and a plurality of interconnected servers, coupled to the clients. At least one of the servers determines at least one characteristic of a file object being located in the storage system, obtains a subset of nodes in the storage system by applying the at least one characteristic to criteria for storing file objects at particular ones of the nodes in the storage system, and examines the subset of nodes to determine if any contain the file object. One of the servers may be a metadata location server that is used to obtain the subset of nodes. The criteria may include at least one policy relating to placement of objects corresponding to files at the time the files are created. The policies may relate to owners of the files. The characteristic information may includes the owner of a target file corresponding to the file object, the date that the target file was created, a business organization associated with the target file, and/or the size of the target file. The file object may correspond to a target file that is part of a hierarchal directory structure and at least one node of the hierarchal directory structure may be unavailable.

BRIEF DESCRIPTION OF DRAWINGS

FIG. 5 is a flow chart illustrating using a metadata location server to determine possible locations for an object corresponding to a target file according to an embodiment of the system described herein.

FIG. 6 is a flow chart illustrating using policy information and object/target file characteristics to determine possible locations for an object corresponding to a target file according to an embodiment of the system described herein.

FIG. 7 is a flow chart illustrating using criteria and object/target file characteristics to determine possible locations for an object corresponding to a target file according to an embodiment of the system described herein.

FIG. 8 is a flow chart illustrating using criteria and object/target file characteristics to determine a location for initially storing an object corresponding to a target file according to an embodiment of the system described herein.

DETAILED DESCRIPTION OF VARIOUS EMBODIMENTS

This application is incorporates by reference both U.S. patent application Ser. No. 12/658,635 (the '653 application) filed on Feb. 9, 2010 (pending) and published U.S. patent application 2009/0112789 (the '789 application) filed on Oct. 31, 2007 (pending).

As discussed in the '653 application, the system may access file objects using object identifiers that are stored among servers, including file objects from both local and external clouds. The file objects may each be assigned a unique object identifier that identifies each file object and distinguishes each file object from other file objects in the system. The system may present to applications a conventional naming structure and directory hierarchy by translating conventional file names into file object identifiers.

Translating from a conventional file name to an object identifier is described in the '653 application in connection with FIG. 14. Note, however, that the traversal illustrated in FIG. 14 of the '653 application assumes that all of the intermediate directory structures (nodes/servers) are available. Nodes/servers may become unavailable for any number of reasons, such as hardware or software errors or communication problems. When that happens, then the processing illustrated in FIG. 14 of the '653 application will not provide a resulting object identifier in situations where the target object is available but the intermediate directory structures are not.

Figure 1:
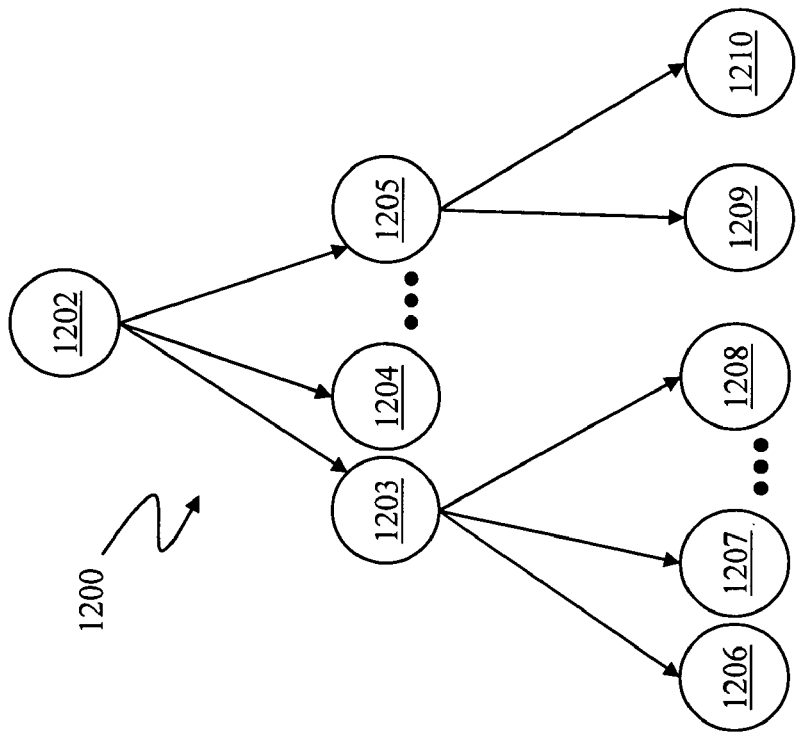
FIG. 1 is a schematic diagram illustrating a hierarchical directory structure that may be traversed according to the system described herein.

Referring to FIG. 1, a diagram 1200 illustrates a hierarchical directory structure that may be traversed according to the system described herein. The diagram 1200 shows a plurality of nodes 1202-1210, where the node 1202 is a root node, the nodes 1203, 1205 are intermediate nodes, and the nodes 1204, 1206-1210 are terminal nodes. Each of the nodes 1202-1210 may represent a server, a group of servers, a data center, etc. The terminal nodes 1204, 1206-1210 may represent data objects corresponding to files while the other nodes 1202, 1203, 1205 may represent directories (intermediate directory structures) in a hierarchical directory structure. For example, a file name "C:\ABC\DEF.doc" indicates a file called "DEF-.doc" is stored in a sub-directory "ABC" located on a root volume "C" so that the node 1202 corresponds to the root volume "C", the node 1203 corresponds to the intermediate directory "ABC", and the node 1206 corresponds to the target file "DEF.doc".

Figure 2:
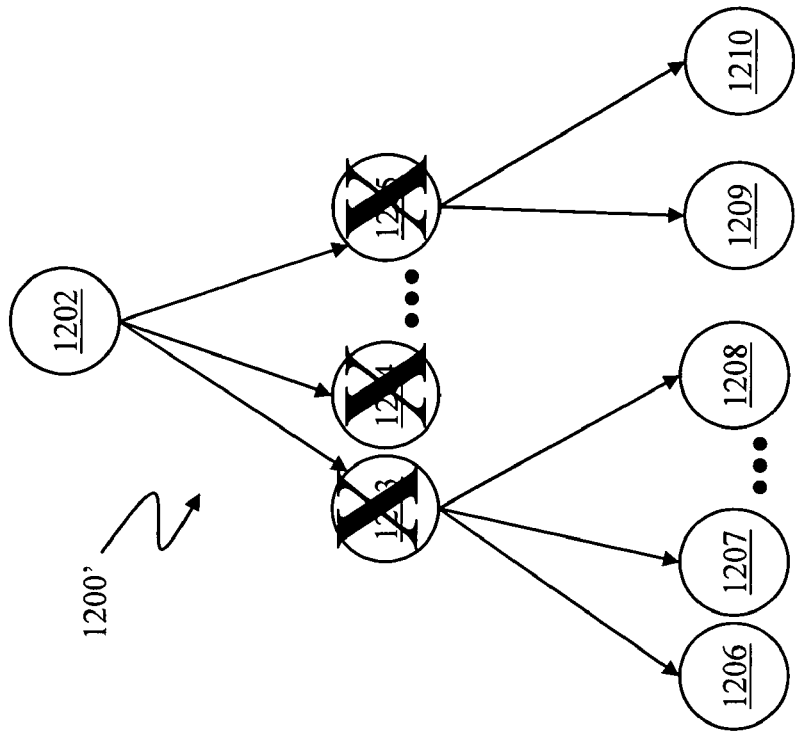
FIG. 2 is a schematic diagram illustrating a hierarchical directory structure with unavailable intermediate nodes by available terminal nodes according to the system described herein.

Referring to FIG. 2, a diagram 1200' illustrates the hierarchical directory structure corresponding to the diagram 1200 with the nodes 1203-1205 having become unavailable. Note that the nodes 1203-1205 may become unavailable for any one or more of a number of reasons including, without limitation, failure of hardware, communication failure(s), software/performance issues, etc. Also note that a node becoming unavailable includes all valid replicas of the node becoming unavailable. That is, a node is available if there exists a valid replica of the node that may be used. For the system described herein, the reason that node(s) become unavailable is not necessarily important.

Note that the diagram 1200' shows the nodes 1206-1210 as being available even though the nodes 1203-1205 are not available. This may occur because, in some cases, parent and children nodes may be provided in different fault domains. In the example illustrated by the diagram 1200', a process that accesses the node 1206 should be able to do so since the node 1206 is available. However, if the node 1206 can only be found by first accessing the parent node 1203, then a process attempting to access the node 1206 may have difficulty because of the unavailability of the node 1203. The system described herein addresses this and allows the node 1206 to be found (accessed) even though the node 1203 is not available. Note that although the intermediate nodes 1203-1205 are shown as being not available, the system described herein works even if the root note 1202 is not available, as described in more detail herein.

Figure 3:
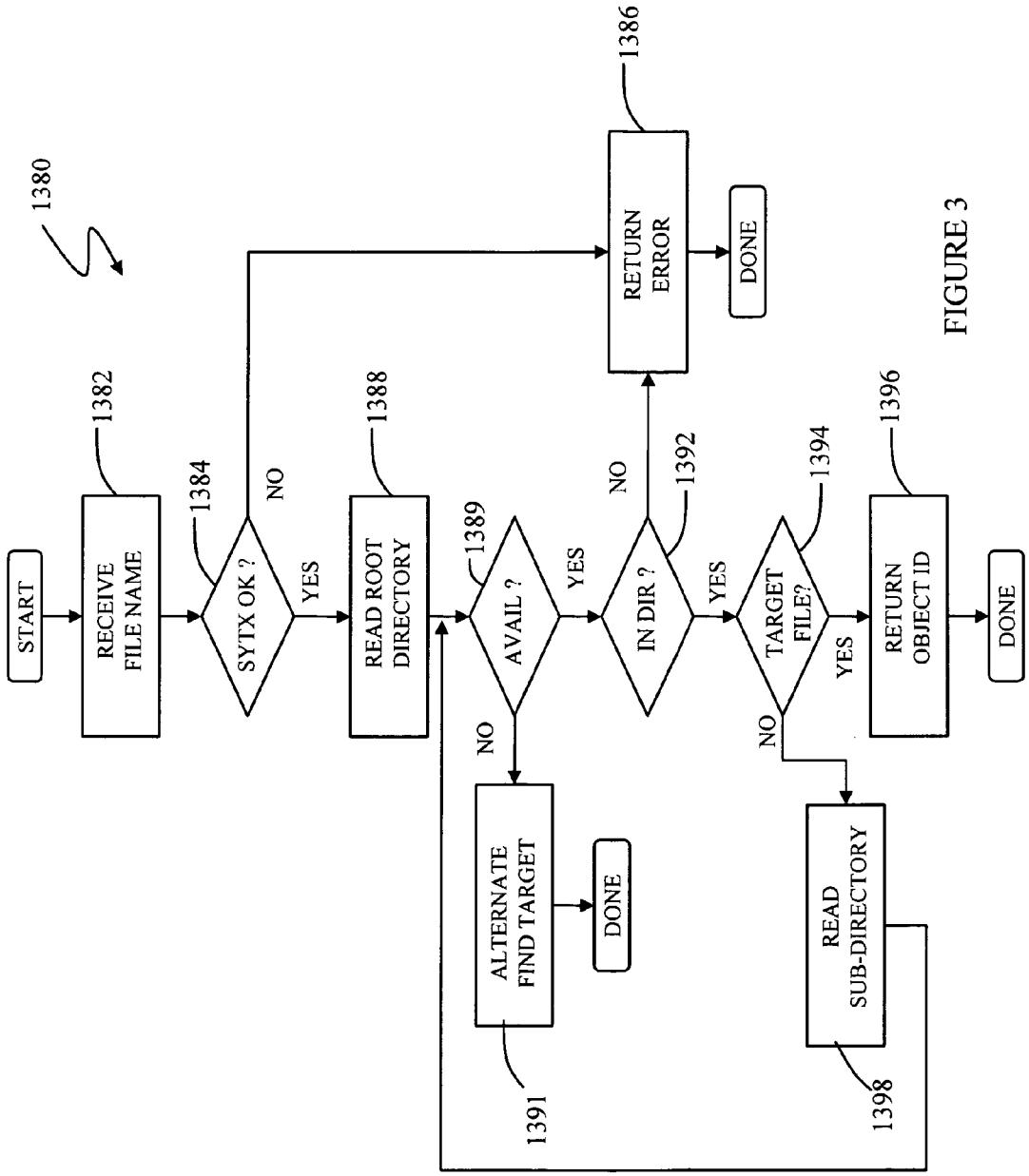
FIG. 3 is a flow chart illustrating an enhanced mechanism for a client to convert file names to object identifiers according to an embodiment of the system described herein.

Referring to FIG. 3, a flow chart 1380 illustrates steps performed in connection with providing a file name translation service (file name service) that translates a conventional hierarchical file name into a file object identifier for a target file (a particular file) that is specified using conventional file naming techniques. The file name translation service may receive a conventional hierarchical file name (e.g., "C:\ABC\DEF.doc") as an input and may return an object identifier (or, in some cases, an error). Processing begins at a first step 1382 where the file name service receives a file name for the target file, such as a conventional hierarchical file name. Following the step 1382 is a test step 1384 where it is determined if the syntax of the file name that was specified is OK. Mechanisms for checking the syntax of a hierarchical file name are known in the art and include, for example, checking that only appropriate characters have been used. If it is determined at the test step 1384 that the syntax is not OK, then control transfers from the test step 1384 to a step 1386 where an error indicator (error message) is returned to the calling process. Following the step 1386, processing is complete.

If it is determined at the test step 1384 that the syntax of the provided name is OK, then control transfers from the test step 1384 to a step 1388 where the root directory is read (e.g., the node 1202 in the diagrams 1200, 1200', discussed above). In an embodiment herein, all file name paths begin at a single common root directory used for all file objects stored in servers. In other embodiments, there may be multiple root directories where specification of a particular root directory may be provided by any appropriate mechanism, such as using a volume identifier, specifically selecting a particular root directory, etc.

Following the step 1388 is a test step 1389 where it is determined if the node corresponding to the sub-directory (or possible the root directory on the first iteration) is available. If not, then control transfers from the test step 1389 to a step 1391 where an alternative technique for finding the (otherwise available) target file object is used. Processing performed at the step 1391 is described in more detail elsewhere herein. Following the step 1391, processing is complete.

If it is determined at the test step 1389 that the node is available, then control transfers from the test step 1389 to a test step 1392 where it is determined if the target file (or sub-directory that is part of the file name path) is in the directory that has been read. If not, then control passes from the test step 1392 to the step 1386, discussed above, where an error is returned. In some embodiments, the file-not-found error that results from the test at the step 1392 may be different from the syntax error that results from the test at the step 1384.

If it is determined that the target file or a sub-directory that is part of the file name path is in the directory that has just been read, then control passes from the test step 1392 to a test step 1394 where it is determined if the directory that has just been read contains the target file (as opposed to containing a sub-directory that is part of the file name path). If so, then control passes from the test step 1394 to a step 1396 where the object identifier corresponding to the target file object is returned to the calling process. Following the step 1396, processing is complete.

If it is determined at the test step 1394 that the directory that has just been read contains a sub-directory that is part of the file name path, then control transfers from the test step 1394 to a step 1398 where the sub-directory is read so that the sub-directory becomes the directory being examined. In effect, processing at the step 1398 traverses the chain of subdirectories to eventually get to the object corresponding to the target file. Following the step 1398, control transfers back to the test step 1389, discussed above, for another iteration.

Figure 4:
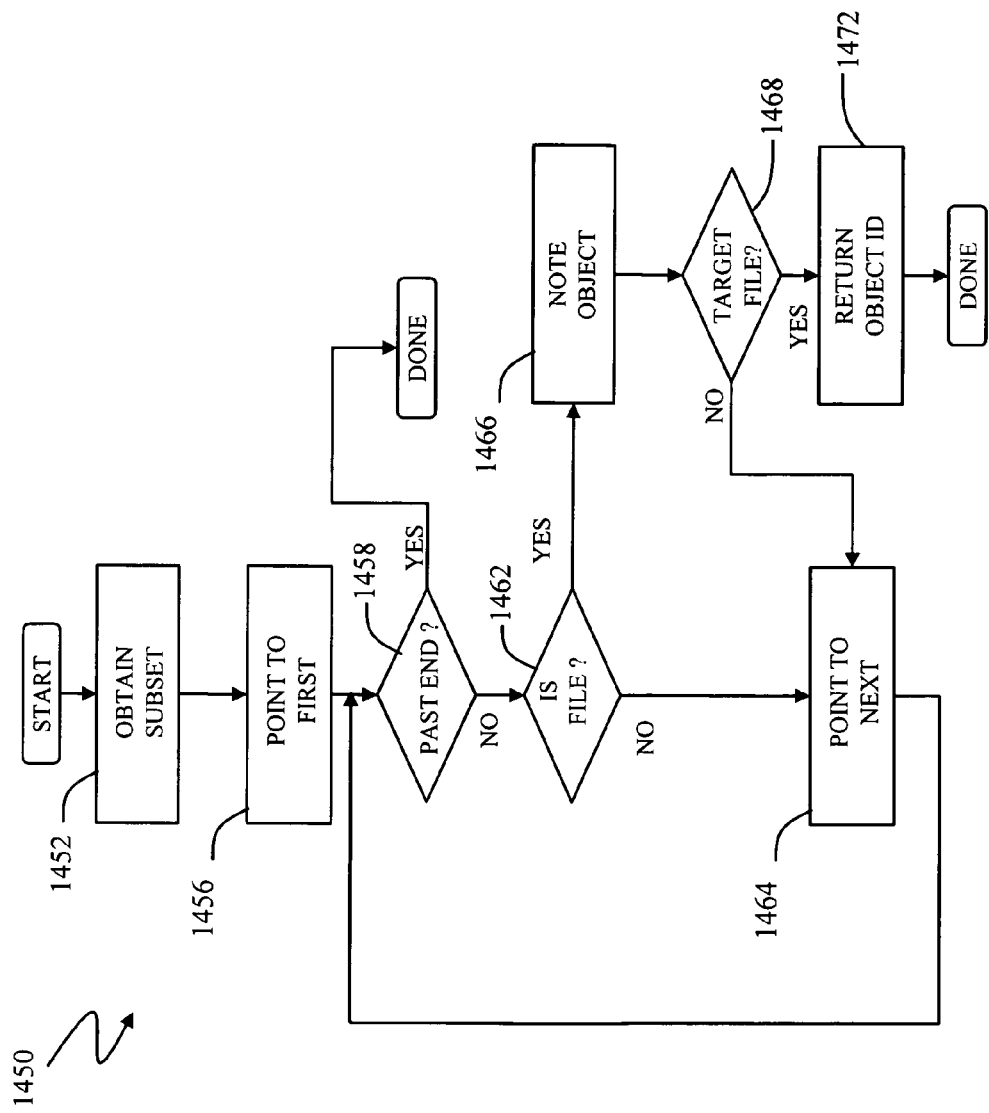
FIG. 4 is a flow chart illustrating obtaining an object identifier corresponding to a target file by examining a subset of objects according to an embodiment of the system described herein.

Referring to FIG. 4, a flow chart 1450 illustrates in more detail processing performed at the step 1391, described above, where alternative processing is provided when nodes in the hierarchical directory structure are not available. Processing begins at a first step 1452 where a subset of the possible nodes containing the target file is obtained. Obtaining the subset at the step 1452 generally includes obtaining less than all of the otherwise possible nodes that could contain the target file by applying characteristics of the target file to some criteria. Obtaining the subset at the step 1452 is described in more detail elsewhere herein.

Following the step 1452 is a step 1456 where a pointer that is used to iterate through the subset obtained at the step 1452 is set to point to the first one. Thus, for example, if ten nodes are obtained at the step 1452 and placed in a table, the pointer is set to point to the first element of the table at the step 1456. If another mechanism is used for the subset (e.g., a linked list) then the iteration pointer may be initialized a different way at the step 1456 (e.g., set to point to first element of the list).

Following the step 1456 is a test step 1458 where it is determined if the iteration pointer points past the end of the element list (or table or whatever mechanism is used). The test at the step 1458 determines if all of the elements of the subset obtained at the step 1452 have been processed. If so, then processing is complete. Otherwise, control transfers from the test step 1458 to a test step 1462 where it is determined if the object being examined (and/or the objects on a node being examined) corresponds to (contains) a file in a directory. If not, then control transfers from the test step 1462 to a step 1464 where the pointer used to iterate through the objects (nodes) is incremented. Following the step 1464, control transfers back to the step 1458, discussed above, for another iteration.

If it is determined at the test step 1462 that the object being examined corresponds to a file in a directory, then control passes from the test step 1462 to a step 1466 where the object is noted in some way, such as being added to a list. Other appropriate information may be noted at the step 1466. Noting the objects in the subset (obtained at the step 1452, described above) that correspond to files is useful in instances where the same subset may be processed again to search for a different target file. Thus, for example, the system may perform a first search for a target file "DEF.doc" in the directory "ABC". Subsequently, if the system performs a second search to find the file "GHI.doc" in the directory "ABC", the object corresponding to the file "GHI.doc" may have already been noted at the step 1466 during the first search. Obviously, the step 1466 is an optimization that may be omitted.

Following the step 1466 is a step 1468 where it is determined if the object being examined corresponds to the target file. If not, then control passes from the test step 1468 to the step 1464, discussed above, where the iteration pointer is incremented. Otherwise, if the object being examined corresponds to the target file, then control passes from the test step 1468 to a step 1472 where the object identifier of the object corresponding to the target file is returned to the calling process. Following the step 1472, processing is complete.

Note that there may be system specific mechanisms for the tests at the steps 1462, 1468. For example, particular object metadata may include an indication that a particular object corresponds to a file, in which case the test at the step 1462 would examine the particular object metadata. Other metadata may indicate a full path specification for an object that corresponds to a file (e.g., "C:\ABD\DEF.doc") so that the test at the step 1468 may determine if there is a match.

There are many possible mechanisms that may be used to obtain the subset at the step 1452. For example, it would be possible to cause the subset to correspond to all of the objects in the system so that follow on processing examines all system objects. However, this may not be desirable or even practical for very large systems. Thus, it is useful to be able to provide a relatively small subset that includes the object corresponding to the target file. Generally, the system described herein uses one or more characteristics of the file object and some sort of metric/criteria to narrow down the possible number of objects in the subset. For example, if the target file is known to be owned by user X (characteristic) and there is a policy/criteria that file objects for user X are stored on server A, server B, and/or server C (metric/criteria), then, when attempting to find the target file, the system provides a subset at the step 1452 that contains only objects from server A, server B, and server C, even if there are many more additional servers in the system. Because of the particular characteristics of the target file and the corresponding policy relating to storage of file objects, the number of objects in the subset may be considerably less than the total number of objects in the system and the need to search unnecessary servers/nodes may be eliminated.

In some cases, the criteria may be based on the identity of the parent directory. For example, a set of parent directories may belong to a particular group. In addition, there may be a policy that indicates that children of directories belonging to the particular group are provided in a different particular group. Thus, it could be the case that the parent (directory) is in group Y and thus the child will be known to be in Group Z.

Referring to FIG. 5, a flow chart 1500 illustrates an embodiment where a metadata location server (as described in the '653 application) is used to help create the subset at the step 1452. As described in the '653 application, the metadata location server (MDLS) may provide location services for an entity seeking the appropriate one of the metadata servers (described in the '653 application) for operations on a particular target file. Each of the MDLS may receive a call indicating characteristics of the target file and may respond by indicating to the calling entity a specific one or more of the metadata servers that could contain an object for a file having the particular characteristics.

Processing for the flow chart 1500 begins at a step 1502 where the characteristic information for the target file may be provided to the MDLS. The characteristic information may be anything about the target file that allows for reducing the number of possible servers/nodes on which an object corresponding to the target file may be stored. For example, the characteristic information may include the owner of the target file, the date that the target file was created, a business organization associated with the target file, the size of the target file, etc. Following the step 1502 is a step 1504 where the subset of objects (or, in some cases, the subset of servers/nodes containing objects) is returned by the MDLS. Following the step 1504, processing is complete.

Referring to FIG. 6, a flow chart 1510 illustrates steps performed in connection with using the policy system described in the '653 application to help create the subset at the step 1452. As described in the '653 application, objects corresponding to files may be placed (set at the time of creation) according to particular policies governing placement of objects corresponding to files. For example, it is possible to have a policy indicating that all files (and thus objects corresponding to files) owned by a particular set of users are to be placed on a particular server or set of servers. In such a case, if the target file is owned by one of the particular set of users, then the subset provided at the step 1452 contains objects that are stored on the particular server or set of servers.

Processing for the flow chart 1510 begins at a step 1512 where the relevant policy, or possibly set of policies, are obtained. The policy(s) obtained at the step 1512 are the policies relating to placement of objects corresponding to files at the time the files are created. Following the step 1512 is a step 1514 where the characteristics of the target file are applied to the policy. For example, if one of the policies indicates that objects for target files in a particular directory are provided on a particular set of servers, then a target file having a characteristic corresponding to being provided in the particular directory means that an object corresponding to the target file is provided in the particular set of servers. Following the step 1514 is a step 1516, where the subset corresponding to applying the characteristic to the policy is obtained. Following the step 1516, processing is complete.

Referring to FIG. 7, a flow chart 1550 illustrates the general mechanism for generating the subset at the step 1452. Processing begins at a step 1552 where a characteristic (or multiple characteristics) of the target file are applied to criteria (e.g., policy) for determining where objects for target files are located. For example, the characteristic could be that the target file is created by user X and the criteria could indicate that objects for target files created by user X are provided on server Y. Following the step 1552 is a step 1554 where the subset of objects resulting from applying the criteria to the characteristics is obtained. Following the step 1554, processing is complete.

Referring to FIG. 8, a flow chart 1560 illustrates steps performed by a metadata location server, as described in the '653 application, (or other mechanism, as appropriate) in connection with assigning server locations for objects corresponding to files. As discussed elsewhere herein, when one or more intermediate directory nodes become unavailable, it is possible to nonetheless find an object corresponding to a target file by first determining the possible servers where the object may have been stored and then examining those servers to locate the object. Thus, it is useful to initially assign a location (server/node) to an object corresponding to a file so that, should intermediate directory nodes become unavailable, it is still possible to determine which server(s) could possible contain the object. As discussed elsewhere herein, the object may be stored on a particular server based on one or more characteristics of the object (and/or corresponding target file) and a policy/criteria applied to the characteristics.

Processing for the flow chart 1560 begins at a step 1562 where an appropriate criteria for assigning a location for the file object is obtained. For example, there may be a policy for assigning locations to objects based on the owner and/or based on the organization to which the owner belongs. Following the step 1562 is a step 1564 where the characteristics of the object (and/or the corresponding target file) are applied to the criteria. The step 1564 is like the step 1552 of the flow chart 1550, described above. Following the step 1564 is a step 1566 where a location (particular server) is assigned to the object based on the results of processing at the step 1564. Following the step 1566, processing is complete.

The system described herein may be used with any server, or any group of servers, capable of providing the functionality described herein. The particular form of the file objects may vary without departing from the spirit and scope of the invention. In some instances, the order of steps in the flow charts may be modified, where appropriate. The system described herein may be implemented using a computer program product/software provided in a computer-readable storage medium (e.g., a fixed computer-readable storage medium) and executed on one or more processors.

While the invention has been disclosed in connection with various embodiments, modifications thereon will be readily apparent to those skilled in the art. Accordingly, the spirit and scope of the invention is set forth in the following claims.

The invention claimed is:

1. A method for locating a file object in a storage system, comprising:
   determining at least one characteristic of the file object, the file object being a target file object;
   obtaining a subset of nodes in the storage system by applying the at least one characteristic to criteria for storing file objects at particular ones of the nodes in the storage system, wherein the subset of nodes is in a hierarchical directory structure having a root node, and wherein at least one of: (i) the root node or (ii) at least one intermediate node in a path between the subset of nodes and the root node, is unavailable;
   examining the subset of nodes to determine if any contain the file object; and
   locating the file object when the file object is contained in at least one of the nodes of the subset of nodes, wherein the file object located is the target file object for which the at least one characteristic is determined, wherein the file object located is not a replica of the target file object, wherein the criteria includes at least one policy relating to placement of objects corresponding to files at the time the files are created, and wherein the characteristic information includes at least one of: an owner of the target file object, a date that the target file object was created, a business organization associated with the target file object, a group associated with a parent directory, or a size of the target file object.

2. the method, according to claim 1, wherein a metadata location server is used to obtain the subset of nodes.

3. the method, according to claim 1, wherein the policies relate to owners of the files.

4. Computer software, provided in a non-transitory computer readable medium, that locates a file object in a storage system, the software comprising:
   executable code that determines at least one characteristic of the file object, the file object being a target file object;
   executable code that obtains a subset of nodes in the storage system by applying the at least one characteristic to criteria for storing file objects at particular ones of the nodes in the storage system, wherein the subset of nodes is in a hierarchical directory structure having a root node, and wherein at least one of: (i) the root node or (ii) at least one intermediate node in a path between the subset of nodes and the root node, is unavailable;
   executable code that examines the subset of nodes to determine if any contain the file object; and
   executable code that locates the file object when the file object is contained in at least one of the nodes of the subset of nodes, wherein the file object located is the target file object for which the at least one characteristic is determined, wherein the file object located is not a replica of the target file object, wherein the criteria includes at least one policy relating to placement of objects corresponding to files at the time the files are created, and wherein the characteristic information includes at least one of: an owner of the target file object, a date that the target file object was created, a business organization associated with the target file object, a group associated with a parent directory, or a size of the target file object.

5. The computer software, according to claim 4, wherein a metadata location server is used to obtain the subset of nodes.

6. The computer software, according to claim 4, wherein the policies relate to owners of the files.

7. A data storage system, comprising:
   a plurality of clients that access files; and
   a plurality of interconnected servers, coupled to the clients, at least one of the servers determining at least one characteristic of a file object being located in the storage system, the file object being a target file object, obtaining a subset of nodes in the storage system by applying the at least one characteristic to criteria for storing file objects at particular ones of the nodes in the storage system, wherein the subset of nodes is in a hierarchical directory structure having a root node, and wherein at least one of: (i) the root node or (ii) at least one intermediate node in a path between the subset of nodes and the root node, is unavailable, examining the subset of nodes to determine if any contain the file object, and locating the file object when the file object is contained in at least one of the nodes of the subset of nodes, wherein the file object located is the target file object for which the at least one characteristic is determined, wherein the file object located is not a replica of the target file object, wherein the criteria includes at least one policy relating to placement of objects corresponding to files at the time the files are created, and wherein the characteristic information includes at least one of: an owner of the target file object, a date that the target file object was created, a business organization associated with the target file object, a group associated with a parent directory, or a size of the target file object.

8. The data storage system, according to claim 7, wherein one of the servers is a metadata location server that is used to obtain the subset of nodes.

9. The data storage system, according to claim 7, wherein the policies relate to owners of the files.

\* \* \* \* \*